United States Patent Office.

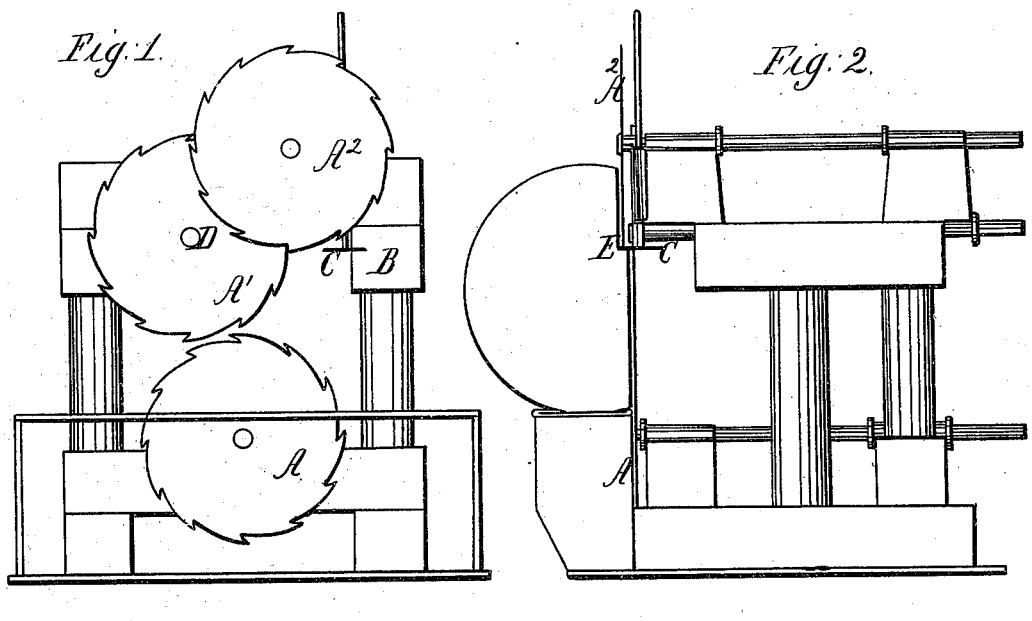

DAVID EVANS, OF EUREKA, CALIFORNIA.

Letters Patent No. 94,878, dated September 14, 1869.

IMPROVEMENT IN CIRCULAR SAW-MILL.

The Schedule referred to in these Letters Patent and making part of the same.

*To all whom it may concern:*

Be it known that I, DAVID EVANS, of Eureka, in the county of Humboldt, and State of California, have invented certain new and useful Improvements in Circular Saw-Mills; and I do hereby declare that the following is a full and exact description of the same, reference being had to the accompanying drawings, and to the letters of reference marked thereon.

The nature of my invention is to provide an improved circular saw-mill, so constructed that a log of great diameter can be sawed without the necessity of first dividing it, which is the usual way when operating with the ordinary gang or circular saw-mills.

My invention consists in so arranging a gang of saws on the frame, and providing a small horizontal saw, which follows or precedes the gang, and rabbets out a piece that the end of the arbor or collar of the centre saw of the gang may pass.

Referring to the drawings which accompany this specification—

Figure 1 is an end elevation.

Figure 2 is a side elevation, showing the end of the log.

Figure 3, a plan of horizontal saw.

The gang $A$ $A^1$ $A^2$, comprises three saws, which are arranged on the frame in the usual way, with the upper saw extended beyond the vertical plane of the lower saws.

Near the end of the cross-beam B of the frame, I attach a vertical spindle, the end of which is provided with a small horizontal saw, C, which precedes or follows the gang on a plane with the cutting-edge of the saw $A^2$, and the collar or arbor D, of the saw $A^1$, and when in operation, rabbets out a longitudinal piece along the edge or joint E, and the upper saw $A^2$ cuts a board down from the upper part, while the two lower saws of the gang cut their width.

The relative position of the gang of three is such, that the upper face of the log is just as much in advance of the lower face of it, as the upper saw is of the lower saw, and the distance between the vertical plane of the upper and lower saws are equal to the thickness of the upper saw $A^2$, added to the thickness of the lower saw A, divided by two (2) and added to the thickness of board or cut, projection of arbor or collar of saw $A^1$, and clearance. The clearance may be greater without affecting the operation and perfect working of the gang.

It will here be observed that when the greatest depth is obtained, the lower cut or board will be the greater, and the upper one the lesser in width.

In operating with my saw-mill at first, the lower saws of the gang slab one side of the log, and the upper saw is not engaged, but as the set advances, the upper saw cuts but little depth, and the horizontal saw following or preceding cuts longitudinally, and a small angular piece of the log is taken off with wane top.

Having thus described my invention, I would here state that I do not claim the horizontal saw for cutting the timber into studding or dimension stuff, as it is called, but

What I do claim, and desire to secure by Letters Patent, is—

The saws A, $A^1$, $A^2$, and C, when arranged to operate substantially as and for the purpose described.

In witness whereof, I have hereunto set my hand and seal.

Witnesses:           DAVID EVANS. [L. S.]
  JAS. M. SHORT,
  ED. H. VANCE.